United States Patent [19]

Armstrong

[11] 4,213,245
[45] Jul. 22, 1980

[54] PROFILE GAUGING

[75] Inventor: David A. Armstrong, Swansea, Wales

[73] Assignee: British Steel Corporation, London, England

[21] Appl. No.: 875,107

[22] Filed: Feb. 3, 1978

[30] Foreign Application Priority Data

Feb. 8, 1977 [GB] United Kingdom ............... 5180/77
Jul. 14, 1977 [GB] United Kingdom ............. 29624/77
Nov. 2, 1977 [GB] United Kingdom ............. 45580/77

[51] Int. Cl.² .......................... G01B 7/28; G01B 7/34
[52] U.S. Cl. ............................... 33/174 P; 33/174 L; 33/DIG. 7
[58] Field of Search ............. 33/174 P, 174 L, 174 Q, 33/DIG. 7

[56] References Cited
U.S. PATENT DOCUMENTS

| 2,633,020 | 3/1953 | Abbott | 33/174 P |
| 3,208,151 | 9/1965 | Rawstron | 33/174 P |
| 3,501,841 | 3/1970 | Adams | 33/174 P |
| 4,120,093 | 10/1978 | Spies | 33/174 L |

FOREIGN PATENT DOCUMENTS

| 923747 | 2/1955 | Fed. Rep. of Germany | 33/174 Q |
| 997633 | 9/1951 | France | 33/174 Q |
| 398352 | 9/1933 | United Kingdom | 33/174 P |
| 216283 | 4/1968 | U.S.S.R. | 33/174 P |

Primary Examiner—Richard R. Stearns
Attorney, Agent, or Firm—Bacon & Thomas

[57] ABSTRACT

Apparatus for gauging surface profile of a workpiece comprises means for maintaining under tension an element which extends at least over the length of the surface to be gauged and which is effective to provide a reference surface against which the surface under test can be compared for gauging, a displacement transducer effective to produce a signal representative of the separation between the surfaces together with means adapted to support the transducer for traverse along the length of the surface to be gauged.

22 Claims, 7 Drawing Figures

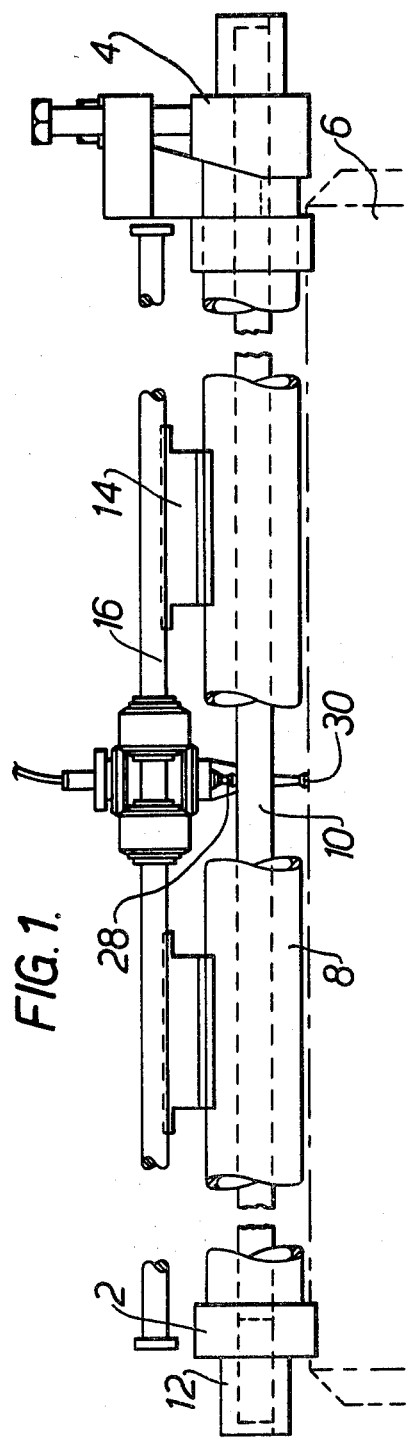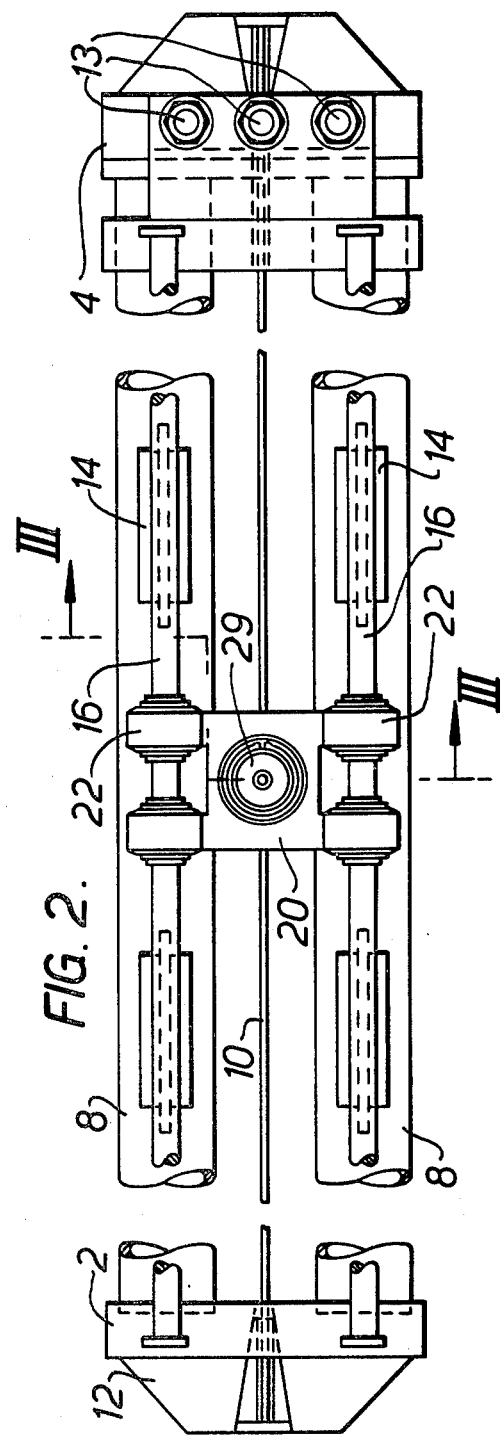

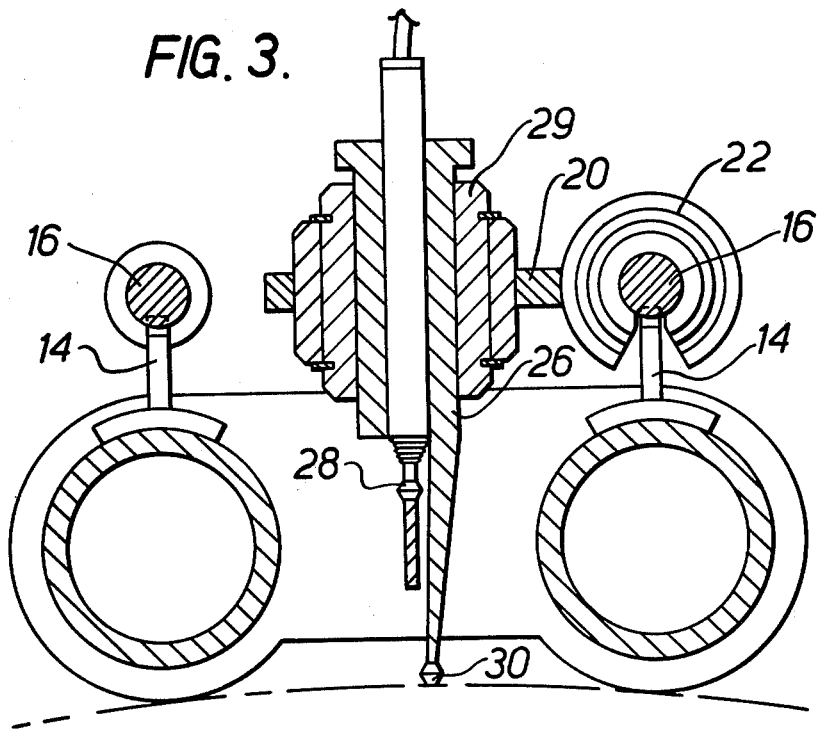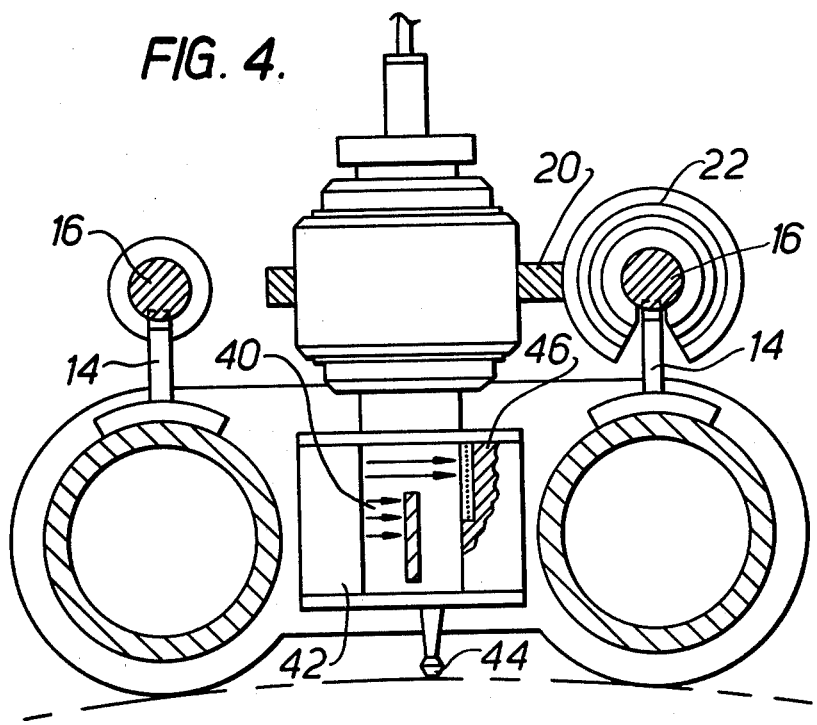

PROFILE GAUGING

This invention relates to the gauging of surface profile and is particularly, although not exclusively concerned with gauging the surface profile of mill rolls.

Mill rolls, especially rolls for cold reducing steel strip, must in general be accurately ground to ensure that strip emerging from the nip between the rolls has the correct profile for the particular stand of the mill. With extended use, both the roll surface profile as well as the surface roughness de-grade progressively to the point when strip having both an unacceptable surface profile and quality are produced. It is accordingly accepted practice, in order to avoid excessive production of unacceptable material, to regularly check roll surface profile and roughness so that a roll can be returned for re-grinding when its profile or roughness exceeds selected limits.

According to one aspect of the present invention, apparatus for gauging surface profile of a workpiece comprises means for maintaining under tension an element which extends at least over the the length of the surface to be gauged and which is effective to provide a reference surface against which the surface under test can be compared for gauging, a displacement transducer effective to produce a signal representative of the separation between the surfaces together with means adapted to support the transducer for traverse along the length of the surface to be gauged.

The means for separating the support members may be adjustable to permit the length of the tensioned element and the length of the surface under test to be varied.

The tensioned element may be a rod, wire or filament or a bundle of rods, wires or filaments.

Preferably, the element is composed of one or more filaments of material which can withstand a high tension over a cross-section providing a low weight, so that the effect of weight-induced sag is reduced to a minimum. One convenient material combining such tensile strength with low weight is carbon fibre, which suitably is used in the form of bundles of individual fibres.

Suitably, carbon or other fibres are embedded in a medium such as an epoxy resin so as to increase the rigidity of the reference surface provided. In this case the element may be pre-stressed by placing it under tension while the embedding medium is hardening.

In the case where the element is embedded, the exposed surface of the medium may be profiled either during or after hardening to produce a reference surface whose profile is other than rectilinear.

The surface under test may be gauged against the reference surface by any suitable displacement transducer such as an optical, or electrical comparator.

In one arrangement, an electro-mechanical transducer has its relatively movable parts respectively adapted to slidably engage the reference surface and the surface under test. The electrical output of the transducer will represent the deviation of the surface under test from the reference surface and provide the required gauging.

In an alternative arrangement, gauging is achieved by a light beam arranged to move in response to the profile of the surface under test and to be progressively cut off by the reference surface. The degree of cut-off, which is representative of deviation between the surfaces, may be sensed by a linear matrix of photo diodes also arranged to move in unison with the beam.

In the case where the measurement of profile over an appreciable excursion is required, the gravitational cantilever of the reference element becomes increasingly significant. The cantilever effect may be reduced by reducing the density and increasing the longitudinal tensile stress in the reference element. The ideal reference element for minimum cantilever accordingly comprises a highly tensioned element of high tensile strength and low mass per unit length.

Such a tensioned element is however particularly sensitive to deflection by contact with the probe of the transducer: in a preferred embodiment of the invention accordingly, gauging is effected by providing a transducer in which at least the probe sensitive to the reference surface is maintained at a constant separation from that surface. In this way any transducer induced loading on the reference surface is avoided.

Preferably the reference surface is provided by a tensioned reference element of high dimensional consistency such as a thin wire of high tensile strength. Conveniently the electrical capacitance between the sensor and the reference element is used to provide an indication of separation. A signal representative of capacitance conveniently is arranged to control the operation of a motor or other prime mover effective to adjust the position of the transducer relative to the reference in order to maintain constant separation. Ideally the motor forms part of a closed loop control system effective to maintain a constant transducer reference element separation.

In some applications, the absolute profile of the surface under test rather than the stability of its deviation from a reference surface is required and this can be achieved by adapting the transducer to be additionally responsive to means incorporating information representative of the deviation of the reference surface from a standard surface.

By these means the signals from the transducer can be suitably combined to produce an output indicative of the profile of the surface under test with reference to the profile of the standard surface.

Suitably, the information means comprise a member which extends along the line of the test surface and which is profiled to reflect the deviation of the reference surface from the standard. The profile on the member preferably is a magnification of the actual deviation between the surfaces in issue so as to increase transducer response. Correction for the magnification is subsequently applied when the signals are combined and translated for read-out.

The transducer may be of any conventional type well known on the art and may be either separate units or be combined in a single unit. The transducer however may be based on electrical, magnetic or optical elements or any combination thereof.

Embodiments of the invention wil now be described by way of example with reference to the accompanying drawings in which:

FIG. 1 is a side view of apparatus for gauging the profile of mill rolls;

FIG. 2 is a top elevation of the apparatus of FIG. 1;

FIG. 3 is an end-on view of the apparatus of FIGS. 1 and 2 and showing electro-mechanical means for gauging surface profile;

FIG. 4 is an end-on view of the apparatus of FIGS. 1 and 2 and showing optical means for gauging surface profile.

Figure 5:
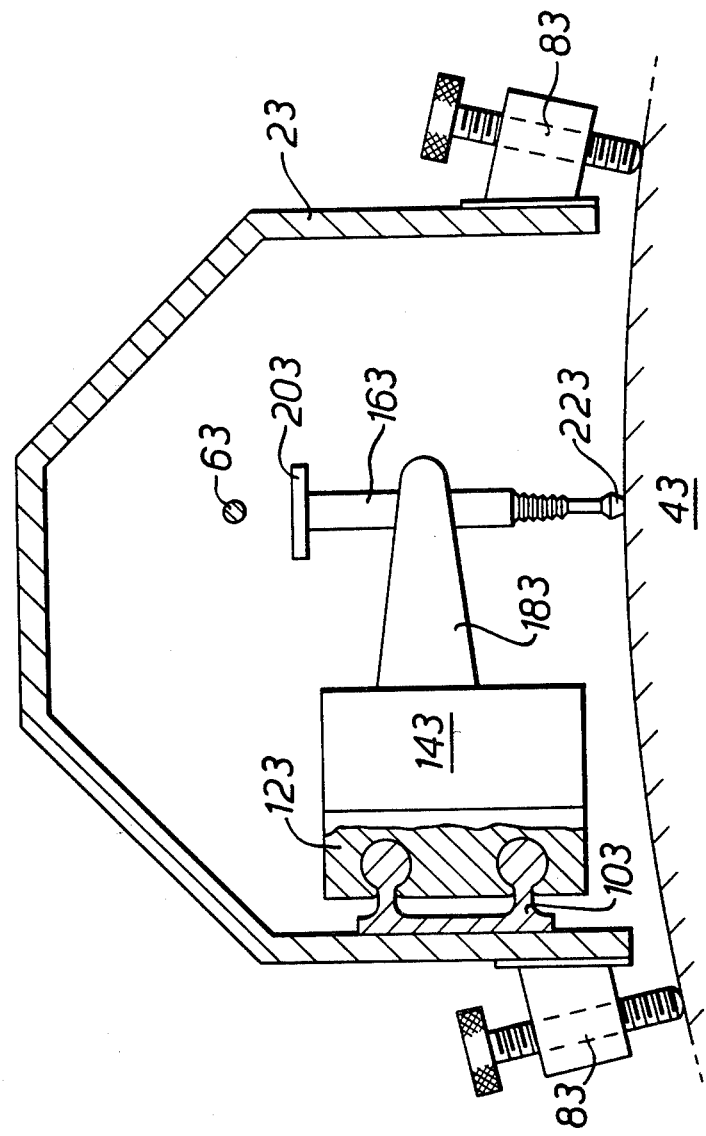
FIG. 5 is a sectional side view of an alternative gauge construction for measuring surface profile by non-contact with the reference surface.

Referring to FIGS. 1 and 2 of the drawings, the apparatus comprises two spaced rigid support members 2, 4 provided with feet adapted to rest upon the surface of the mill roll 6 under test. While the support members are shown as extending substantially over the whole of the axial length of the roll, they may extend over a shorter length if gauging over only a shortened length, for example the centre portion of the roll, is required.

The support members 2, 4 are held in spaced relationship by heavy gauge rigid tubes 8, which engage with grooves cut in the support members. Engagement between the tubes and the support members is maintained by the tension applied to the reference element 10.

The reference element 10 in this embodiment of the invention comprises a bundle of some 44×10 carbon fibre of about 7–8 microns diameter. The fibres, which are supplied in 44 tows of 10,000 fibres each, are embedded in an epoxy resin medium, in a mould providing a rectangular section of 16 mm×1.75 mm, one of the narrow faces of which is used as the reference surface against which the surface of the roll 6 will be gauged. The fibres occupy some 60 percent of the volume of the element which is maintained in this embodiment of the invention under a tension of some 1200–1600 meganewtons per square meter. Each of the ends of the fibre bundle is arranged to form a conical termination 12 to enable the element to be securely held in tension by engagement with corresponding recesses in plates extending from the support members. The element is tensioned by tightening of the set screws 13 which bear upon a wedge-shaped member effective to separate the element termination from the support members.

The reference surface on the tensioned element may be used purely for purposes of comparison between successive surfaces under test. It may, however, be used as a secondary standard for the absolute measurement of surface profile. In this case the element may itself be calibrated against a primary standard.

Supported upon the tubes 8 are saddles 14 which support spaced tubular guides 16. A carriage 20 is provided with runners 22 adapted to slide along the guide 16 to enable the carriage to traverse the length of the roll surface which is to be gauged.

In the embodiment of FIG. 3 gauging is achieved by a linear electro-mechanical transducer indicated generally at 29 and mounted upon the carriage 20. Transducer 29 which may be of any conventional kind, comprises a body portion 26 which contains the mutual inductors sensitive to the position of a movable yoke. The yoke (not shown) is coupled to a probe 28 which slidably abuts the reference surface of the element 10. An extension to the body portion 26 terminates in a similar probe 30 which slidably abuts the surface of the roll under test. The signal produced by the transducer accordingly is representative of the separation between the probes and can be used to indicate the deviation between the surfaces to provide gauging.

In the embodiment of FIG. 4, gauging is achieved by a suitably collimated light beam 40 obtained from a source indicated generally at 42. The source 42 is supported in a framework which can move with the carriage 20 and which carries a probe 44 slidably abutting the surface of the mill roll. Also mounted upon the support is a linear array of photo diodes 46 which receive that portion of the beam of light 40 which is not cut off by the reference element 10. The output from the photo diode array accordingly is representative of the movement of the probe 44 relative to the reference surface of the element 10 and indicates deviation between the surfaces to provide gauging.

The apparatus of the invention may be used for the gauging of rolls which have been removed from the mill for testing. By suitable design of the support members, however, the apparatus may be used for gauging mill rolls in situ. In this case the support members may be adapted to nest within the nip between adjacent rolls so either can be tested.

In situ testing of rolls by the apparatus of the invention displays particular advantages in the case of hot mills where changes in temperature of a conventional reference bar induced by radiation from the hot rolls can produce unacceptable distortion to which the element of the invention is less prone.

For ease of testing, the carriage can in addition be motorised while the gauging signal derived from the transducer used can be translated to provide the specific read-out required.

Referring to FIG. 5, the alternative gauge comprises a rigid member 23 of inverted U section extending along the length of the surface under test which in this embodiment is the surface of a mill roll 43.

Member 23 acts as a spacer for support end pieces (not shown) by which the reference element in the form of a wire 63 is tensioned by any conventional means. The gauge is supported upon the surface of the roll 43 by way of feet 83 which are adjustable to maintain a substantially constant separation between the surface of the roll and the wire 63.

Secured to the inner surface of member 23 is a linear guide 103 which slidably supports a carriage 123 movable along the length of the roll. Mounted on the carriage 123 is a support block 143 for a linear transducer 163 which is responsive to the deviation between the surface of the roll 43 and the tensioned reference wire 63.

Support block 143 on which the transducer 163 is mounted by way of arm 183 also is provided with a guide permitting movement substantially normally of the roll surface. Movement is provided by way of a suitably coupled prime mover (not shown) such as a motor which is driven by a current source responsive to the separation between the body portion of the transducer 163 and the wire 63.

The source which may be of any type well known in the art is arranged to be responsive to the electrical capacitance between the wire 63 and the body portion of the transducer 163.

The elements 143, 183, 203 and 233 may herein be referred to as a "sensor assembly".

To increase the capacitance effect, the body portion of the transducer terminates adjacent the wire 63 with a plate 203 effective to increase the capacitive area. Plate 203 broadly can be considered as part of a probe assembly, including a sensing means here shown as the plate 203, in that it responds to and generates a signal as a result of its relationship with wire 63 in the context of the control circuit for the motor that controls the position of transducer 163.

In use of the gauge, the transducer 163 is moved along the length of the roll surface so that the movable portion which terminates in probe 223 slidably abuts the roll surface and responds to deviation in surface profile. This deviation is measured by reference to the tensioned wire 63 which is maintained at a constant distance from the plate 203. This constant separation ensures that the output signal from the transducer 163 accurately represents deviation of roll profile from the reference without any distortion in the reference induced by transducer loading.

Figure 6:
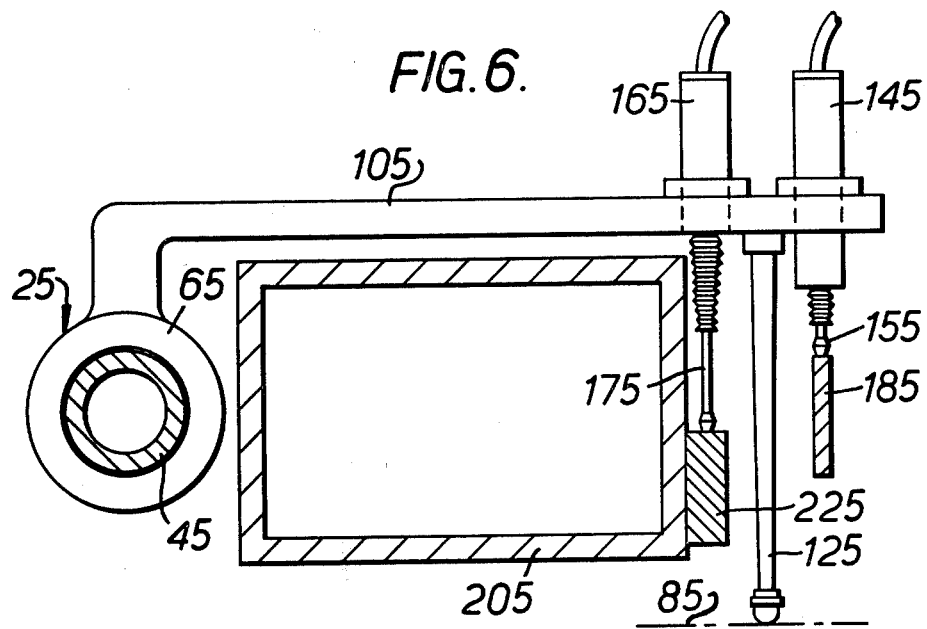
FIG. 6 is a sectional end-on view of a guage for measuring surface profile including correction with respect to a standard surface and FIG. 7 is a schematic side view of the means incorporated in the gauge of FIG. 6 for containing information of the deviation between the profile of the reference surface and a standard surface.
Figure 7:
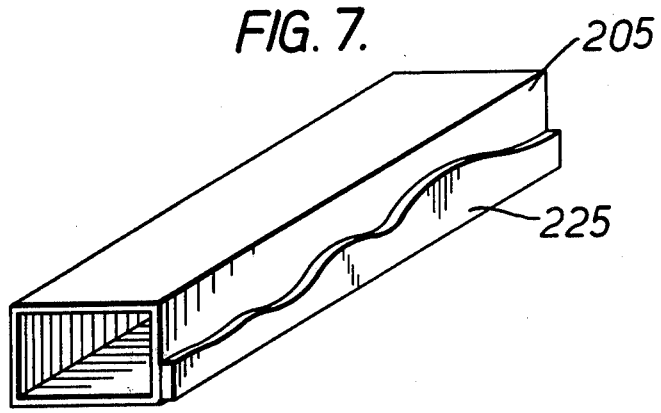

Referring to FIG. 6 of the drawings, the further form of profile gauge shown comprises a linear bearing which is indicated generally at 25 and which extends along the effective measuring length of the gauge.

The bearing 25 comprises a support 45 on which a carriage 65 is slidably moveable so as to be able to traverse the effective length of the surface under test indicated generally at 85.

Secured to carriage 65 is a cranked 105 arm which also is moveable along the test surface and which can pivot about the linear bearing. Arm 105 carries a probe 125 which slidably abuts the test surface and produces movement of the arm 105 in accordance with variation in surface profile. The length and configuration of the arm 105 and the relatively small excursion in surface profile will produce a substantial vertical movement of that portion of arm 105 to which probe 125 is attached.

Also secured to arm 105 and adjacent probe 125 are two linear displacement transducers, 145, 165 of the type well known in the art. Transducer 145 has its body portion secured to arm 105 and its movable probe 155 slidably abutting the reference surface 185 of the gauge. The reference surface, as in the gauge of our co-pending application comprises a tensioned element of carbon fibres in a matrix of cured resin.

Transducer 145 accordingly produces a signal representative of deviation between the profile of the surface 85 under test and the reference surface 185. The element 185 is held in tension between two members which are not shown and which are rigidly spaced by tube 205 of rectangular section.

Transducer 165 also has its body portion secured to arm 105; its moveable probe 175 slidably abuts the upper surface of a member 225 whose profile is a magnified representation of deviation between the reference surface 185 and a standard or sub-standard surface of a high and known accuracy.

Such standard surfaces are maintained at the National Physical Laboratory and like institutions. Transducer 165 accordingly produces a signal representative of correction to be applied to the signal from transducer 145 in order to enable the gauge to compare the profile of the surface under test with that of the standard surface.

Correction is in a suitable comparator (not shown) which compensates for the magnification inherent in the signal from transducer 165. The output of the comparator is applied to any suitable read-out device such as a chart recorder or the like.

The member 225 which is secured to the side of tube 205 is produced by measurement obtained by substituting the standard surface for the surface 85 under test.

The signal from transducer 145 obtained in this way may be used to cut the profile of member 225 by any conventional means, for example, by way of a programme responsive profile cutter.

It will be appreciated that while the invention has been described with reference to the gauging of surface profile of mill rolls, it can equally be applied to the gauging of any other surface.

It will also be appreciated that while the invention has been described with reference to a rectilinear reference surface, it can equally be used with a reference surface of any selected profile.

While in the case of non-contact gauging with the reference surface, capacitive means for measuring separation may be employed, it will be appreciated that optical inductive or other well known methods of distance measuring can equally be utilised.

I claim:

1. Apparatus for gauging the surface profile of a workpiece comprising a reference element extending at least the length of the workpiece surface to be gauged and having a reference surface against which the surface under test can be compared, means for maintaining said element under tension in the direction of its length, together with a sensor assembly supported by a carriage means enabling the sensor assembly to move along said element, said sensor assembly incorporating a pair of relatively moveable probes, one of the probes being supported in a manner whereby it follows the surface profile of the workpiece surface under test when moved along same, and the other probe being supported in spaced relationship adjacent said reference surface and including a sensing means for sensing the electrical reactance between the sensing means and the reference surface, said other probe and sensing means moveable along said reference surface in spaced relationship with respect thereto, and means for moving said sensing means relative to said carriage means towards or away from said reference surface in response to the electrical reactance between the sensing means and the reference surface, whereby the sensing means and the reference surface can be maintained apart a predetermined distance while the sensor assembly is moved therealong.

2. Apparatus as claimed in claim 1, wherein said sensing means generates a signal in response to the electrical reactance between the sensing means and the reference surface, said electrical reactance being a function of the distance between said reference surface and the sensing means.

3. Apparatus as claimed in claim 2, wherein the sensor assembly includes an adjustable support means coupling said assembly to said carriage means for enabling said sensing means to move towards and away from said reference surface while said sensing means moves along said reference surface; said means for moving said sensing means relative to said carriage means comprising prime mover means controllable in response to a signal produced by said sensing means that is representative of the electrical reactance between the reference surface and the sensing means.

4. Apparatus as claimed in claim 3, said sensing means being moveable towards and away from said reference surface, and relative to said one of the probes that follows the profile of the workpiece.

5. Apparatus as claimed in claim 4, wherein the relative movement of the probes is electrically compared.

6. Apparatus as claimed in claim 3, including means for controlling said prime mover in response to a signal produced by said sensing means in a manner whereby said sensing means is maintained at a constant distance from said reference surface.

7. Apparatus as claimed in claim 2, wherein said signal is a function of the capacitance between said sensing means and said reference surface.

8. Apparatus according to claim 1, including means for maintaining a constant spacing between the reference surface and the sensing means while the latter is moved along said surface.

9. Apparatus according to claim 8, wherein said means for maintaining a constant spacing comprises a prime mover means.

10. Apparatus according to claim 3 or 9, wherein the prime mover means is an electric motor.

11. Apparatus according to claim 3 or 9, wherein the prime mover means is an electric motor controllable in response to a signal produced by said sensing means and representative of the spacing between said sensing means and said reference surface.

12. Apparatus as claimed in claim 11, including an energization source for said prime mover, wherein the prime mover and the energization source form a closed loop with said sensing means.

13. Apparatus as claimed in claim 11, wherein the signal is varied as a function of the capacitance between the reference surface and said sensing means.

14. Apparatus as claimed in claim 3, including an energization source for said prime mover, wherein the prime mover and the energization source form a closed loop with said sensing means.

15. Apparatus as claimed in claim 8 or 3, wherein said reference element is tensioned between members which are spaced over at least the length of the surface to be gauged, and wherein the members are adapted for engagement with the workpiece surface.

16. Apparatus as claimed in claim 1, said one of the probes being in sliding contact with the profile of said surface under test, and also being relatively moveable with respect to said sensing means; and means for generating a signal responsive to the distance between the last said probe and said sensing means.

17. Apparatus as claimed in claim 1, 8, 3 or 16, wherein said reference element comprises at least one filament.

18. Apparatus as claimed in claim 1, 8, 3 or 16, wherein said reference element comprises a bundle of carbon fibres.

19. Apparatus as claimed in claim 1, 8, 3, or 16, wherein said reference element comprises a filament bundle embedded with a rigid medium.

20. Apparatus as claimed in claim 19, wherein said filament bundle is embedded in a curable resin.

21. Apparatus according to claim 1, wherein said one of the probes is adapted to slidably abut that surface.

22. Apparatus for gauging the surface profile of a workpiece comprising a reference element extending at least the length of the workpiece surface to be gauged and having a reference surface against which the surface under test can be compared, means for maintaining said element under tension in the direction of its length, together with a sensor assembly supported by a carriage means enabling the sensor assembly to move along said element, said sensor assembly including a support member and a pair of relatively moveable probes supported by said member, one of the probes being supported in a manner whereby it follows the surface profile of the workpiece surface under test when moved along same, and the other probe being entirely supported in spaced relationship adjacent said reference surface and including a sensing means for sensing the electrical reactance between the sensing means and the reference surface, said sensing means moveable with said other probe along said reference surface in spaced relationship with respect thereto, and means for moving said support member relative to said carriage means and relative to said reference surface to effect movement of said sensing means towards or away from said reference surface in response to the electrical reactance between the sensing means and the reference surface whereby the sensing means and the reference surface can be maintained apart a predetermined distance while the sensor assembly is moved therealong.

* * * * *